United States Patent [19]
Lacy

[11] 4,013,184
[45] Mar. 22, 1977

[54] TRAILER FOR LIFTING AND TRANSPORTING A CONTAINER

[75] Inventor: James H. Lacy, Lawrenceville, Ga.

[73] Assignee: Lacy's Metal Products, Inc., Lawrenceville, Ga.

[22] Filed: Sept. 22, 1975

[21] Appl. No.: 615,699

[52] U.S. Cl. .............................. 214/505; 214/77 R; 214/515

[51] Int. Cl.² .......................................... B60P 1/28

[58] Field of Search .......... 214/501, 504, 505, 515, 214/517, 77 R, 523, 85.5

[56] References Cited
UNITED STATES PATENTS

| | | | |
|---|---|---|---|
| 2,305,148 | 12/1942 | Dempster | 214/77 R X |
| 2,624,484 | 1/1953 | Dalton | 214/505 X |
| 2,852,148 | 9/1958 | Jones | 214/77 R |
| 3,701,443 | 10/1972 | Lely | 214/77 R |

Primary Examiner—Albert J. Makay
Attorney, Agent, or Firm—Patrick F. Henry

[57] ABSTRACT

A trailer which is towed by a pickup truck or other vehicle has a base chassis frame on which is mounted a pivoted support frame which receives and supports a large refuse container pulled into place on the support frame by means of a lifting frame swinging on a shaft at the front of the trailer and operated by a hydraulic cylinder. The lifting frame is attached to the refuse container by means of a flexible chain or cable which is secured to the refuse container and holds same in place during transport.

17 Claims, 6 Drawing Figures

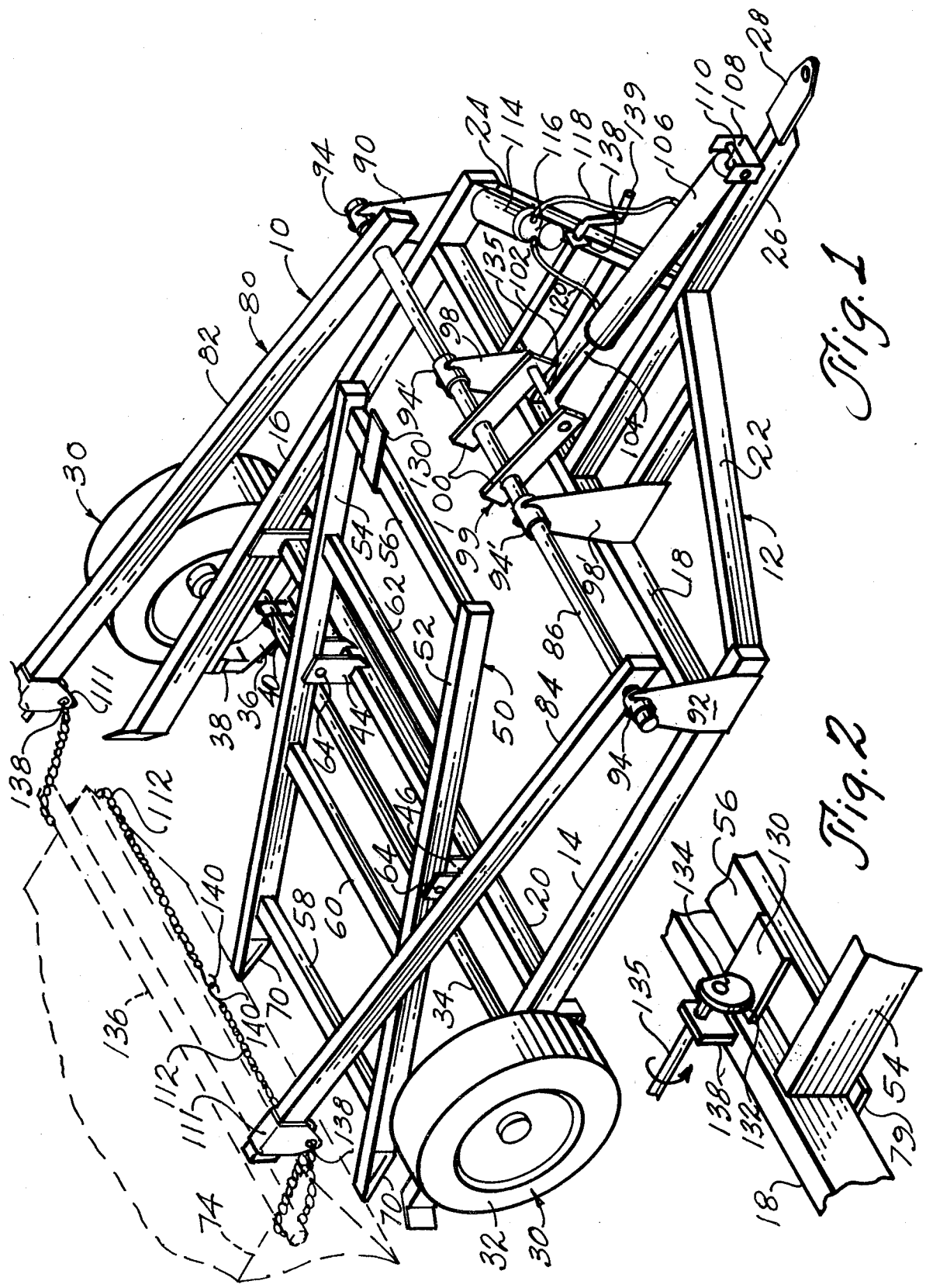

TRAILER FOR LIFTING AND TRANSPORTING A CONTAINER

BACKGROUND OF THE INVENTION

1. Field of the Invention

Vechicles for lifting and transporting refuse containers and especially trailers having lifting devices thereon.

2. Description of the Prior Art

Large steel bins and refuse containers are normally moved by special trucks and similar vehicles which have huge power driven arms that engage the bins and lift same to the rear of the truck for dumping as well as transport of the bins and containers from one location to another. It is often necessary to move an empty bin, or one that is filled only with lightweight material, from one location to another and sometimes for long distances such as from one town to to another. It is quite an expensive proposition to use one of the large specialized trucks for this purpose since the cost of the operation of the truck per mile is quite high and the loss of the vehicle for other uses results in a significant expense. There is no known trailer device which is of the medium trailer classification that can be used with an ordinary passenger, or pickup truck or station wagon for lifting and transporting one of the large refuse bins or containers from one location to another. While it is possible to place one of these large containers on a large flatbed truck and to anchor same in place by chains and the like, this is quite an expensive proposition and requires the use of special hoisting equipment to get the container onto the truck and similar hoisting equipment to get the container off the truck once it has reached the intended location.

SUMMARY OF THE INVENTION

An object of this invention is to provide a medium weight classification of trailer which includes a means thereon for supporting a large refuse bin, container and similar device and a lifting means for placing the container on the support means and for removing same therefrom.

An additional object of this invention resides in the particular arrangement of the trailer chassis, support frame and lifting frame as to simplicity of construction and dependability of operation.

Another object of this invention resides in the particular mechanical device for operating the lifting frame and including a hydraulically driven power system.

An additional object of this invention resides in the use of a pivoted support frame in conjunction with a swinging lifting frame and flexible cable or chain for attachment to the lifting frame.

Another object of this invention resides in the particular latching and locking of the support frame for quick engagement and disengagement.

An additional advantage of the present invention is found in the particular mechanical aspect of the power driven lifting apparatus.

Other and further objects and advantages of this invention will become apparent upon reading the following specification taken in conjunction with the accompanying drawings.

BRIEF DESCRIPTION OF THE DRAWINGS

FIG. 1 is a perspective view of a trailer constructed in accordance with the present invention.

FIG. 2 is a perspective view of the latch.

BRIEF DESCRIPTION OF A PREFERRED EMBODIMENT

Figure 3:
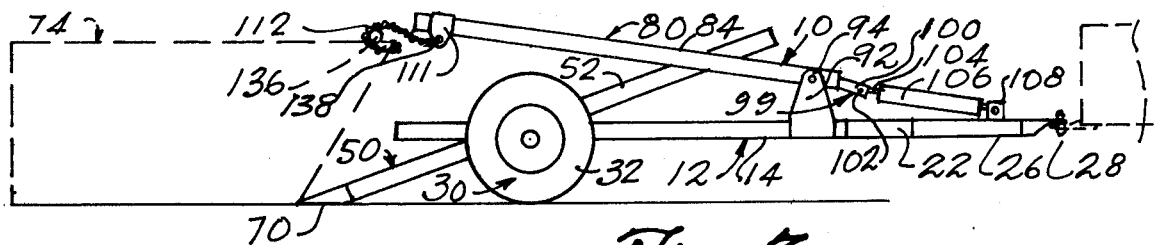
FIG. 3 is one of a series of four diagrammatic views illustrating the lifting and positioning of a refuse bin.

The complete trailer device is designated by reference numeral 10 and comprises an elongated trailer chassis designated by reference numeral 12 having longitudinal chassis members 14, 16 connected by transverse steel box chassis members 18, 20 welded to the longitudinal members 14, 16 and being provided at the front with intersecting steel box frame members 22, 24 welded to a center steel box frame drawbar member 26 which has a conventional trailer hitch coupling 28 thereon. Drawbar 26 is also welded to the cross frame or transverse frame member 18.

The trailer is supported by means of conventional and ordinary trailer wheels 30 comprising tire and wheel assemblies 32 on opposite sides of the trailer 10 and mounted on an axle 34 extending transversely of the trailer. Each end of the axle 34 is supported by conventional leaf springs 36 mounted in leaf spring supports 38 attached at each end of each leaf spring 36 to the longitudinal frame member 14, 16 respectively. Each leaf spring 36 is held in place on the end of the axle 34 by means of a U-bolt connecting assembly 40 which is of common and conventional construction and use in the trailer and automotive field.

A pair of spaced pairs of support plates 44, 46 are welded to the cross frame chassis member 20 and each supports a respective side of a movable support frame 50 comprising longitudinal steel box frame members 52, 54 connected by steel transverse support frame members 56, 58, 60 and 62 thereby forming a rigid rectangular, substantially planar support frame which is mounted on pivots 64 attached to each of a respective longitudinal member 52, 54 thru the respective pairs of plates 44, 46. The lower ends of members 52, 54 are tapered and provided with diagonal steel shoes 70 to lie substantially flat against the floor surface when the upper end of support frame 50 is elevated and the bottom end lowered in the manner shown in FIG. 3, for the purpose of picking up a large heavy refuse bin or container 74 which may weigh in the vicinity of 2,000 lbs. empty. The support frame normally rests on projecting supports 79 on frame member 18.

A power frame designated generally by reference numeral 80 for pulling and/or lifting the container on support frame 50 comprises a pair of longitudinal power frame members 82, 84 each having the front end thereof rigidly attached to a cross shaft 86 rotatably mounted at each end thereof on a bearing support post 90, 92 in which there is a shaft bearing assembly 94 which supports the shaft 86. Shaft 86 is also supported on a pair of intermediate and spaced shaft support plate members 98, 98' each having a shaft bearing assembly 94'. A lifting frame actuator device 99 comprises a pair of spaced longitudinal plates 100 having one end welded to shaft 86 and the other end attached to a cross shaft 102 to which is attached the piston rod 104 operated inside of a hydraulic cylinder 106 having the end thereof mounted on a bracket 108 on a pivot pin 110 thereon. The ends of members 82, 84 have attaching brackets 111 thereon which are respectively attached by means of respective chains 112 to the container 74 and each bracket 111 is slidable on the respective member 82, 84.

A hydraulic power fluid apparatus comprises an electric motor 114 driving a hydraulic pump 116 which pumps hydraulic fluid thru a pair of hydraulic lines 118, 120 connected to the cylinder 106 in such a way as to cause extension of the rod 104 or retraction thereof depending upon the operation of the controls for pump 116. Motor 114 may be a "Prestolite" (trademark) 12 volt motor. Pump 116 may be one made by John S. Barnes Corporation, Rockford, Illinois, Model RJ-hydraulic (U.S. Pat. No. 2,051,914). The power for the motor 114 is supplied from a 12 volt D.C. automobile battery which may be the one in the towing vehicle.

A latching device for the support frame 50 comprises a latch plate 130 on the frame 50 having an upstanding edge flange 132 which is engaged by a cam 134 mounted on a control crank rod or shaft 136 rotatably extending thru and supported on an upstanding plate 138 mounted on cross frame member 18 and another plate is in alignment therewith on frame member 24. The crank rod 136 has a crank handle 139. Rod 136 is moved inwardly or outwardly in the plates 138 in order to pull the cam 134 away from the plate 130 to release the movable support frame 50.

The container may have a long shaft 136 thereon with projecting ends about which loops of the chain 112 are looped with sufficient tension for lifting the container 74 onto the frame. A removable pin 138 may be used in brackets 111 for attaching and detaching the chain 112 or if preferred the conventional shackles or U-bolts may be used. As seen in FIG. 1, the ends of two separate chain 112 may be attached permanently to each respective bracket 111 and the other ends of each respective chain hooked together by hooks 140 on each chain 112.

Figure 4:
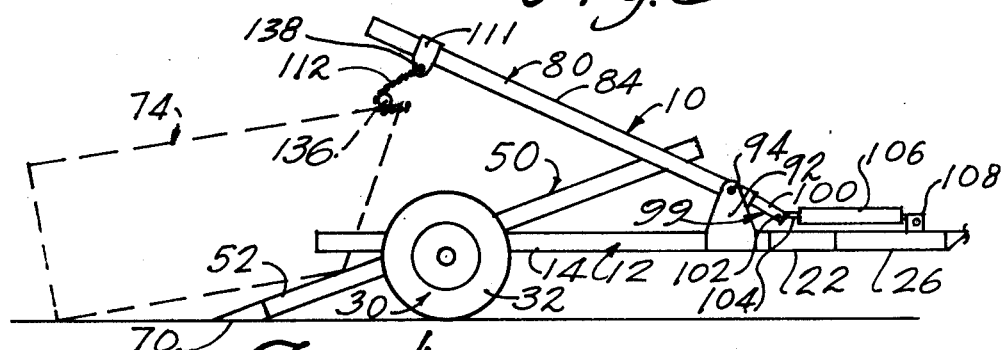
FIG. 4 is the second of the four diagrammatic views showing the refuse container being pulled onto the support frame.
Figure 5:
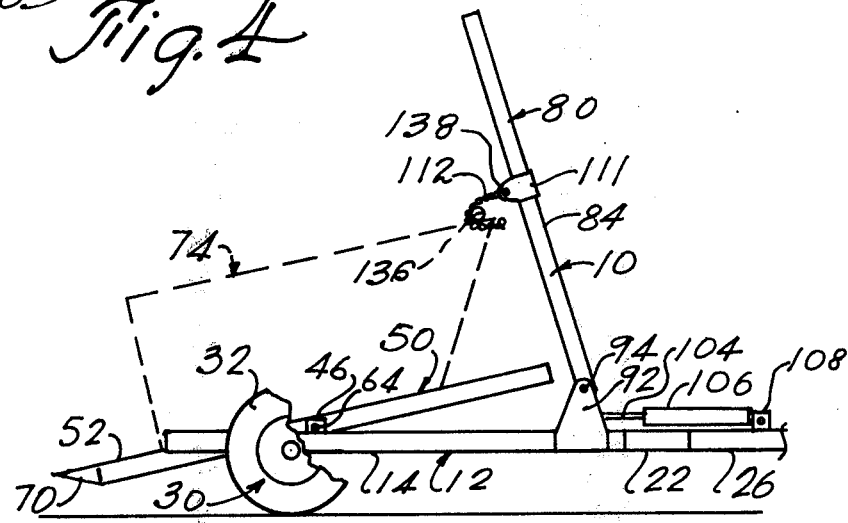
FIG. 5 is the third of the four diagrammatic views showing the refuse container almost in uppermost position and about to tilt the support frame into substantial horizontal position.
Figure 6:
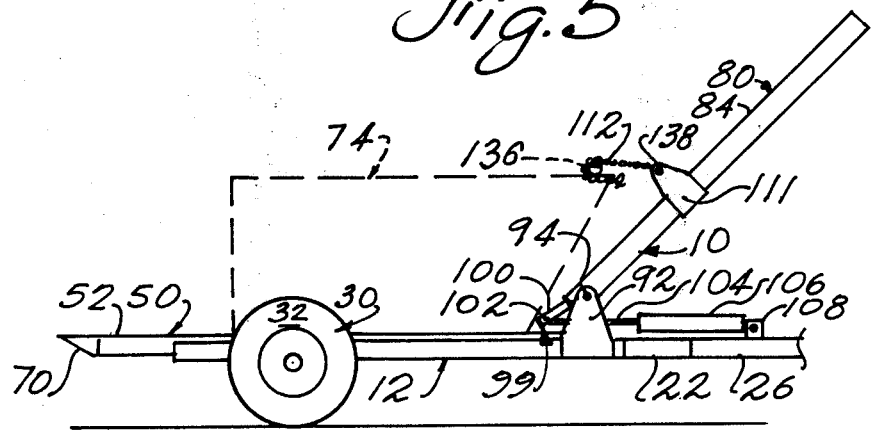
FIG. 6 is the last of the four diagrammatic views showing the refuse container in position for being transported by the trailer.

The operation of the device is apparent from the foregoing description and the FIGS. 3 thru 6, inclusive. By way of summary: after bringing the trailer in proper position next to container 74 the movable frame 50 is released by operating the crank handle 139 pulling the rod 136 to disengage the cam from plate 130 thereby releasing the movable frame 50 to the position next to the container 74 as shown in FIGS. 1 and 3. Then, if necessary, the brackets 111 are moved to outermost position at the ends of the members 84 on frame 80 and the chain 112 fastened into position as described previously. A switch, not shown, is actuated by the operator to activate the motor 114 and the pump 116 which will drive rod 104 to move the members 100 thereby rotating shaft 86 and powerlifting frame 80 which pulls the container 74 up the frame 50 on the top thereof as shown in FIGS. 4 and 5 and as the heavy container moves up frame 50 it overbalances the frame about its pivots 64 which causes the frame 50 to rise at the rear and drop at the front onto the chassis 12. During the movement of the container 74 and frame 50 the brackets 111 are traveling downwardly on the respective frame members 82, 84 until the ultimate position shown in FIG. 6 reached. Therefore the brackets and chain arrangement 112 is self-adjusting to the extent that the degree of flexibility is there to permit the frame 80 to make the transfer from almost horizontal to vertical and then to a direction downwardly of the trailer and with the brackets 111 and chain 112 coupling providing the necessary degree of movement. The container may be transported in the position shown in FIG. 6 and upon arrival at the destination the cylinder 106 is operated to move piston rod 104 in the other direction thereby driving the frame 80 arcuately forwardly to rear which will unbalance the frame 50 with container 74 thereon thereby lowering the container 74 slowly to the ground. Trailer 10 may be driven forwardly away from the container 74 if necessary to expedite the off-loading.

While I have shown and described a particular embodiment of this invention with a suggested mode of operation, there are various deviations and changes from that shown which would come within the scope of this invention as defined by a proper interpretation of the appended claims.

What is claimed is:

1. In a vehicle for loading and unloading and transporting a large container:

a vehicle trailer having a trailer drawbar with a trailer coupling thereon, a rigid trailer frame chassis which is normally stationary when the container is being lifted on or off the trailer, wheels on the opposite side of said trailer frame chassis for engaging the ground while said trailer is moving thereover, container support means on said trailer chassis for supporting said container and said container support means comprising a movable support frame extending transversely across and being movably attached to said trailer frame chassis to receive said container, said support frame being inclined longitudinally from normal horizontal position in a direction from the ground upwardly over the trailer frame chassis for loading and unloading a container, and to move during loading or unloading of said container to shift with the longitudinal movement of said container thereby supporting at least part of the weight of said container and also guiding same, a power means on said trailer chassis for movement thereon and for attachment to said container to move same, said power means comprising a longitudinal lifting frame having one end thereof attached to said container and the other end attached to the trailer for movement from a forwardly position in which said container is in place to a rearwardly position for loading said container on said movable frame, and means for attaching and detaching the end of said lifting frame to said container, said means removably attaching the ends thereof to said lifting frame and to said container, respectively, and being relatively movable on said lifting frame as said container is moved along said support frame and vice versa when said container is unloaded, said lifting frame pulling said container onto said movable frame and therealong as said movable frame shifts into position on said chassis with said container thereon.

2. The device in claim 1 wherein: said means for removably attaching includes a flexible member such as a chain or cable for attachment to said container.

3. The device claimed in claim 1 wherein there is a hydraulic piston and cylinder on said trailer, hydraulic power means for actuating said hydraulic piston in said cylinder in one direction or the other, and means attaching said piston rod to said power frame for driving said frame.

4. The device claimed in claim 1 wherein said support means is a frame which comprises longitudinal support frame members connected by transverse support frame members, and said power means is a frame comprising longitudinal lifting frame members.

5. The device claimed in claim 4 wherein said longitudinal lifting frame members are connected on said trailer chassis by means of a transverse shaft extending across said chassis and being supported for rotation thereon.

6. The device claimed in claim 1 wherein said power means lifting frame is operated by a powerlift, and there is a hydraulic cylinder and piston assembly on said trailer chassis, hydraulic power means for actuating said cylinder and piston assembly to move said piston in one direction or the other for the purpose of rotating said power shaft thereby to move said power frame, and means for connecting said piston to said shaft to rotate said shaft in one direction or the other selectively in response to the movement of said piston rod thereby driving said lifting frame to place the ends thereof rearwardly for lifting a container or to move said frame to a forwardly inclined position to lift said container onto the support frame.

7. The device claimed in claim 1 wherein said lifting frame has the ends thereof attached to said container, and flexible means such as a cable or chain for attaching the ends of said lifting frame to said container.

8. The device claimed in claim 1 wherein there is a shaft attached to a hydraulic cylinder and piston assembly on said trailer chassis, hydraulic power means for actuating said cylinder and piston assembly to move said piston in one direction or the other for the purpose of rotating said shaft thereby to move said lifting frame, and means for connecting said piston to said shaft to rotate said shaft in one direction or the other selectively in response to the movement of said piston rod thereby driving said lifting frame to place the ends thereof rearwardly for lifting a container or to move said frame to a forwardly inclined position to lift said container onto the support frame.

9. In a trailer for transporting a large container and for loading and unloading same:
a vehicle trailer having a trailer drawbar with a trailer coupling thereon,
a rigid trailer frame chassis which is normally stationary when a container is being lifted on or off the trailer,
wheels on the opposite side of said trailer frame chassis for engaging the ground while said trailer is moving thereover,
a movable support frame movably mounted on said trailer chassis and being movable from a position extending substantially co-extensive with said trailer chassis frame to a position inclined with respect thereto to place the lower end of said support frame against the ground next to a container to be lifted thereon,
a movable lifting frame on said trailer chassis having one end thereof attached near the forward end of said trailer for movement thereon and the other end being movable from a position near the rear of said trailer for attachment to said container to a position extending forwardly of said trailer when said container is on said support frame and said support frame is on said trailer chassis to move said container onto and along said support frame,
means for removably attaching the ends of said lifting frame to said container, said means for removably attaching being relatively movable on said lifting frame as said container is moved along said support frame.

10. The device in claim 9, wherein: said means for removably attaching includes a flexible member such as a chain or cable for attachment to said container.

11. The device in claim 9, wherein: said means for attachment includes respective brackets slidably mounted on opposite sides of said lifting frame.

12. The device claimed in claim 9 wherein there is a hydraulic piston and cylinder on said trailer, hydraulic power means for actuating said hydraulic piston in said cylinder in one direction or the other, and means attaching said piston rod to said lifting frame for driving said lifting frame.

13. The device claimed in claim 12 wherein said support frame comprises longitudinal support frame members connected by transverse support frame members, and said lifting frame comprises longitudinal lifting frame members.

14. The device claimed in claim 13 wherein said longitudinal lifting frame members are connected on said trailer chassis by means of a transverse shaft extending across said chassis and being supported for rotation thereon.

15. In a vehicle for transporting a large container and for loading or unloading same:
a vehicle trailer having a trailer drawbar with a trailer coupling thereon,
a rigid trailer frame chassis which is normally stationary when the container is being lifted on or off the trailer,
wheels on the opposite side of said trailer frame chassis for engaging the ground while said trailer is moving thereover,
container support means on said trailer chassis for supporting said container and said container support means comprising a movable frame pivotally attached to said trailer intermediate the length of said chassis to receive said container, said frame being inclined in a direction from the ground upwardly over the trailer frame chassis for loading and unloading a container,
a power means on said trailer chassis for movement thereon and for attachment to said container to move same, said power means comprising a lifting frame having one end thereof attached to said container and the other end attached to the trailer, said frame comprising longitudinal frame members, and means for attaching and detaching the end of said lifting frame to said container,
means for securing said movable frame in place on said chassis, said frame being unbalanced so as to become inclined when released,
bracket members slidably mounted on said longitudinal frame members as said lifting frame moves said container onto or off of said support frame, flexible means removably connecting each respective bracket member with said container, a transverse drive shaft mounted on said frame members, and power means on said trailer for driving said drive shaft to move said lifting frame.

16. The device claimed in claim 15 wherein said support frame is latched in place on said trailer chassis, and latch means for latching said support frame in place.

17. The device claimed in claim 16 wherein said latch means comprises a latch cam engageable with said support frame, and a latch cam actuating member for moving said latch cam to engage and disengage same.

* * * * *